US006056166A

United States Patent [19]

Schmitz et al.

[11] Patent Number: 6,056,166

[45] **Date of Patent: *May 2, 2000**

[54] PORTABLE LIQUID DISPENSER

[76] Inventors: Jon E. Schmitz, 2410 Primrose Dr., Pasadena, Tex. 77502; Jeffrey B. Howlett, 13838 Placid Brook Ct., Houston, Tex. 77059

[ * ] Notice: This patent is subject to a terminal disclaimer.

[21] Appl. No.: 09/309,832

[22] Filed: May 11, 1999

Related U.S. Application Data

[63] Continuation of application No. 08/950,696, Oct. 15, 1997.

[51] Int. Cl.[7] ................................ A01C 5/64; B67D 5/40

[52] U.S. Cl. ............................ 222/385; 222/63; 222/173; 222/333; 222/529; 222/530; 222/608; 222/626

[58] Field of Search .............................. 222/63, 173, 175, 222/180, 331, 333, 382, 529, 530, 608, 626

[56] References Cited

U.S. PATENT DOCUMENTS 5,154,317 10/1992 Roppolo, III ............................ 222/66

*Primary Examiner*—Kevin Shaver
*Assistant Examiner*—David Deal
*Attorney, Agent, or Firm*—Steven L. Christian

[57] ABSTRACT

The present invention provides a portable dispenser of potable liquid, and includes an insulated container for storing the liquid, and a secondary container connected to the insulated container. A pump is positioned in either the insulated container or the secondary container, and has a suction conduit that communicates with or extends to the bottom of the insulated container. The pump also has a discharge conduit that is connected to a manifold in the secondary container. A plurality of liquid dispensing conduits are connected to the manifold for communication with the discharge conduit. Each of the liquid dispensing conduits extends from the manifold through a dispenser opening in the secondary container. Means for also provided for activating the pump whereby the liquid stored in the insulated container is delivered to the dispensing conduits via the discharge conduit and the manifold for consumption by a plurality of users.

7 Claims, 7 Drawing Sheets

PORTABLE LIQUID DISPENSER

CROSS-REFERENCE TO RELATED APPLICATIONS

This application is a continuation of U.S. patent application Ser. No. 08/950,696, filed on Oct. 15, 1997.

BACKGROUND OF THE INVENTION

1. Field of the Invention

The present invention relates to dispensers of potable liquid such as water, and more particularly to portable dispensers whose component parts are all integrated in a compact assembly for easy transportation and storage.

2. The Related Art

The present state of the art is typified by U.S. Pat. No. 5,154,317 to Michael A. Roppolo, III. The '317 patent discloses a liquid dispensing unit that requires a hand truck or "dolly" for supporting and carrying an insulated container suitable for storing potable liquid. The unit includes a battery positioned in a housing detachably secured to the frame of the dolly. The unit further includes a pump having a discharge hose connected to a manifold that is also carried by the frame of the dolly. The manifold is in turn connected to a plurality of liquid dispensing hoses for providing the liquid to users.

The invention disclosed in the '317 patent thus relies on a dolly as the framework supporting the component parts of the dispensing unit. As such, the unit is not compact nor is it portable in situations that prohibit access by rolling the dolly. For example, the dispensing unit of the '317 patent could not easily be lowered into a pit or manhole where workers are positioned. Furthermore, the unit is not easily loaded or unloaded from a vehicle when transported from one location to another.

In response to the shortcomings of the prior art, it is an object of the present invention to provide a portable liquid dispenser whose component parts are all integrated in a compact assembly for easy transportation and storage.

It is a further object to provide such a dispenser wherein the components are easily accessible for maintenance and/or cleaning.

SUMMARY

The objects described above, as well as other objects and advantages are achieved by a portable dispenser, including an insulated container for storing potable liquid, and a secondary container connected to the insulated container. A submersible pump is positioned in the insulated container and has a discharge conduit connected thereto that extends into the secondary container via openings in the insulated container and the secondary container. A manifold is positioned in the secondary container and connected to the discharge conduit of the pump, and a plurality of liquid dispensing conduits are connected to the manifold for communication with the discharge conduit. Each of the liquid dispensing conduits extend from the manifold through a dispenser opening in the secondary container. Means for also provided for activating the pump whereby the liquid stored in the insulated container is delivered to the dispensing conduits via the discharge conduit and the manifold for consumption by a plurality of users.

The pump activating means includes an electrical power supply such as a rechargeable battery positioned in the secondary container and electrically connected to the pump via openings in the insulated container and the secondary container to form an electrical circuit. The secondary container has its own lid which is moveable between open and closed positions for permitting access to the battery. Switch means are electrically connected between the pump and the power supply to open and close the circuit. Each of the liquid dispensing conduits terminates in a dispenser nozzle assembly for controlling the flow of liquid through the conduits.

In one embodiment of the liquid dispenser, the insulated container includes an insulated body and an insulated lid having a circular opening therethrough. The secondary container of this embodiment is substantially cylindrical and has an outer diameter that approximates the circular opening permitting the secondary container to extend through the circular opening. The cylindrical wall of the secondary container includes a central conduit section whose outer diameter approximates the circular opening in the lid, and the central conduit section is positioned in the circular opening and connected to the lid such that an upper portion of the central conduit section extends above the lid and a lower portion extends below the lid. The cylindrical wall further includes upper and lower conduit sections whose inner diameters approximates the outer diameter of the central conduit section. The upper conduit section fits about and is connected to the upper portion of the central conduit section, and the lower conduit section fits about and is connected to the lower portion of the central conduit section.

In a second embodiment of the liquid dispenser, the insulated container includes an insulated body having an upper opening therein, and the secondary container serves as a lid that closes the upper opening of the insulated body.

In a still further embodiment, the pump is positioned in the secondary container, and has a suction conduit connected thereto that communicates with the insulated container via openings in the secondary container and the insulated container. The pump's discharge conduit extends to the manifold within the secondary container.

BRIEF DESCRIPTION OF THE DRAWINGS

In the drawings, wherein like reference characters are used throughout to describe like parts.

DETAILED DESCRIPTION OF THE PREFERRED EMBODIMENT

Figure 1:
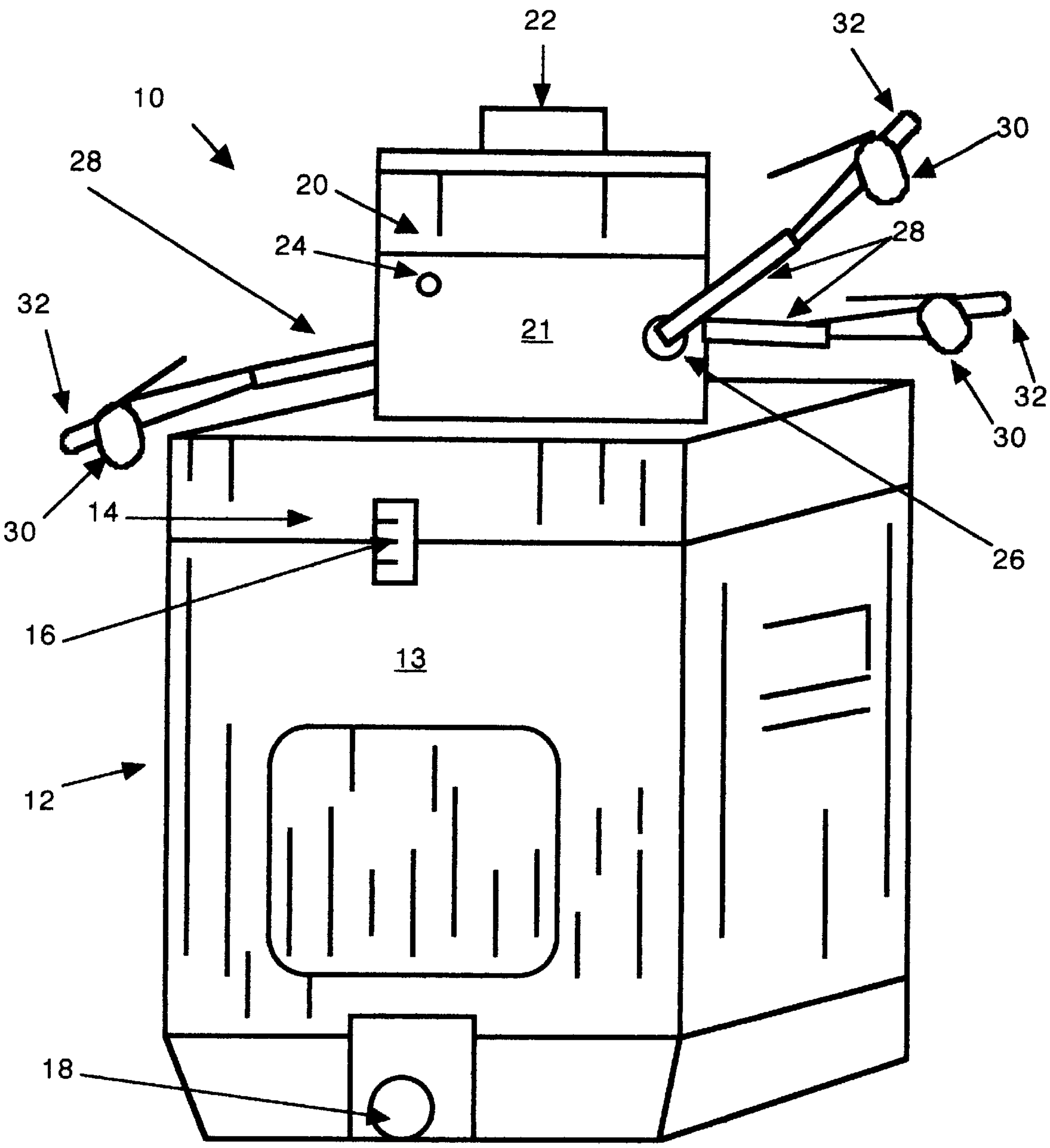
FIG. 1 is a perspective view of one embodiment of a liquid dispenser in accordance with the present invention.

FIGS. 1–4 illustrate one embodiment of a portable liquid dispenser 10 in accordance with the present invention. Dispenser 10 includes an insulated container 12 for storing liquid, such as potable water. Container 12 is preferably a commercially available upright drinking cooler having a capacity of at least 5 gallons, such as those sold under the trademark IGLOO, and is made up of insulated body 13 and insulated lid 14. In typical fashion, lid 14 is connected to body 13 by lid latch 16, and container body 13 is provided with drain spigot 18.

Figure 2:
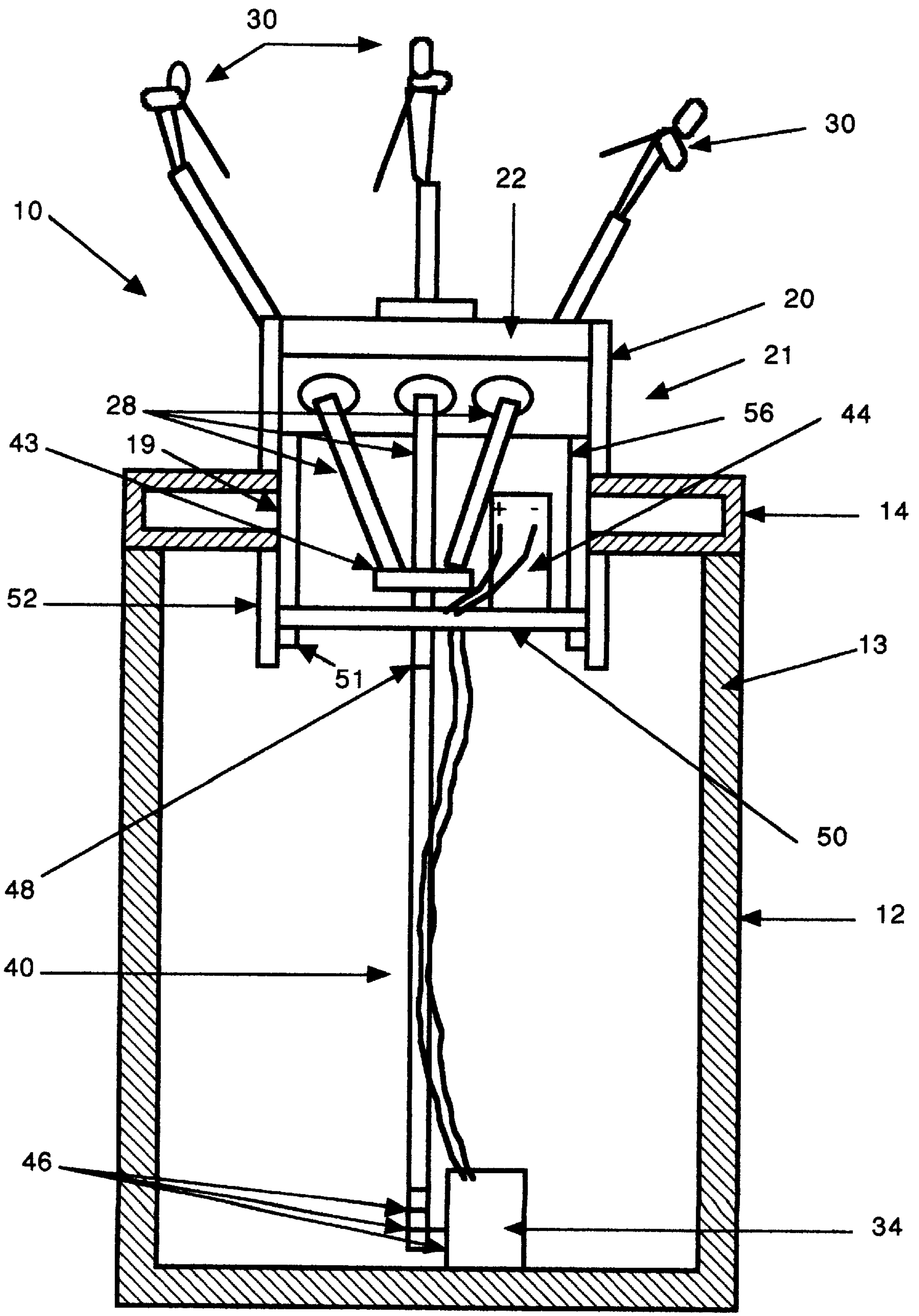
FIG. 2 is a sectional elevational view of the liquid dispenser shown in FIG. 1.

Secondary container 21 is connected to lid 14 of container 12 through circular opening 19 in the lid, as seen in FIG. 2. The secondary container has a substantially cylindrical wall made up of three interconnecting cylindrical sections of PVC conduit. Central conduit section 56 has an outer diameter of approximately 8", closely matching the size of the circular opening. Central conduit section 56 permits the secondary container to extend through lid 14 such that an upper portion of the central conduit section extends above the lid and a lower portion extends below the lid. The cylindrical wall of container 21 further includes upper and lower conduit sections 20, 52 whose inner diameters approximates the outer diameter of central conduit section 56. Upper section 20 may be, for example, an 8" PVC "clean out" section having internal threads at its upper end for engagement by threaded PVC cap 22. Thus, the secondary container has a removable lid. Lower conduit section 52 may be an 8" PVC coupling having internal ring 51 for typical engagement by the opposing ends of PVC conduit coupled together in the coupling. Upper conduit section 20 fits about and is connected to the upper portion of central conduit section 56 using a suitable glue, and lower conduit section 52 fits about and is connected to the lower portion of the central conduit section also with the glue.

The cutting of circular opening 19 through dispenser lid 14 produces two circular discs from the cut through the respective upper and lower walls of the lid. Circular cutout 50 from the upper wall of lid 14 is positioned within coupling 52 from above, and placed upon and glued into engagement with coupling ring 51. Central conduit section 56 is also positioned within coupling 52 from above and then glued into engagement with cutout 50. In this manner, secondary container 21 is connected to lid 14 and provides a sealed environment for storage of certain components of liquid dispenser 10, as described further below.

Submersible pump 34, preferably a Rule brand pump having a capacity of 800 gallons per hour, is positioned at the bottom of insulated container body 13, and is equipped with a suction nozzle positioned for intake of the liquid stored in container 12. The suction nozzle may be provided with a suitable intake conduit (not shown) if necessary. Pump 34 further has flexible discharge conduit 40, such as a ¾" hose, connected to its discharge nozzle with ¾" stainless steel clamp 46 and extending into secondary container 21 via circular opening 19 in lid 14 and opening 41 in circular cutout 50. Connector 48 is mounted in opening 41, and includes a lower ¾" hose barb mated to an upper ¾" PVC male thread fitting. The hose barb extends below cutout 50 for connection to the upper end of discharge conduit 40, while the male thread fitting extends above cutout 50 for connection to manifold 43 disposed in secondary container 21.

Figure 3:
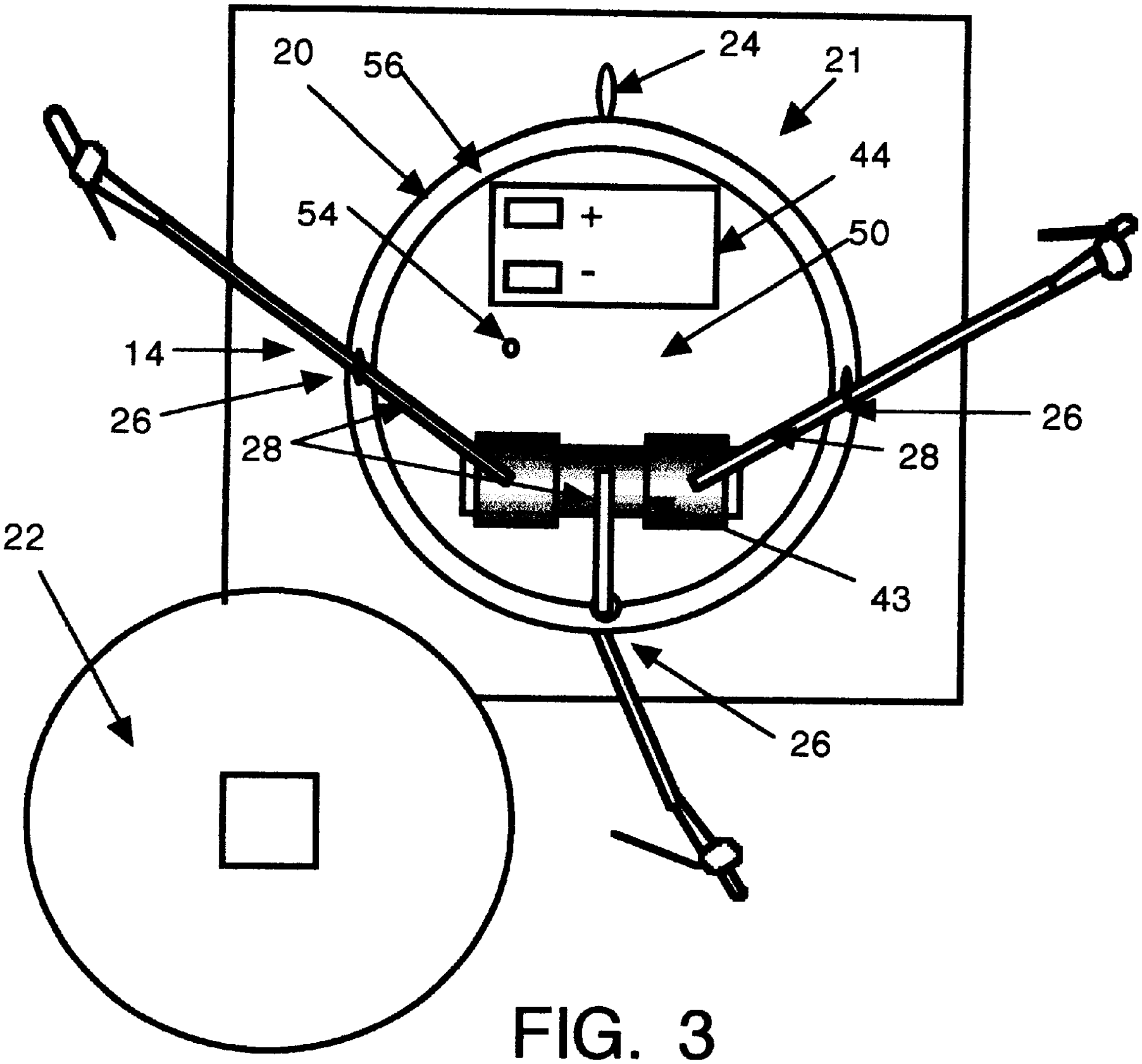
FIG. 3 is a plan view of the liquid dispenser shown in FIG. 1, with a lid for the dispenser's secondary container removed.
Figure 3A:
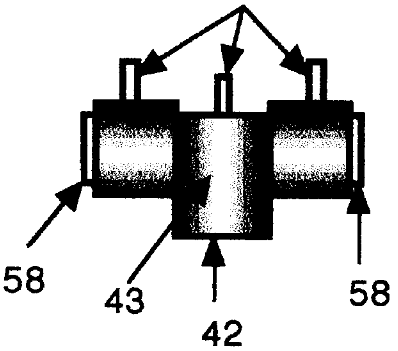
FIG. 3A is a detailed elevational view of a manifold used to deliver liquid to liquid dispensing conduits.
Figure 4:
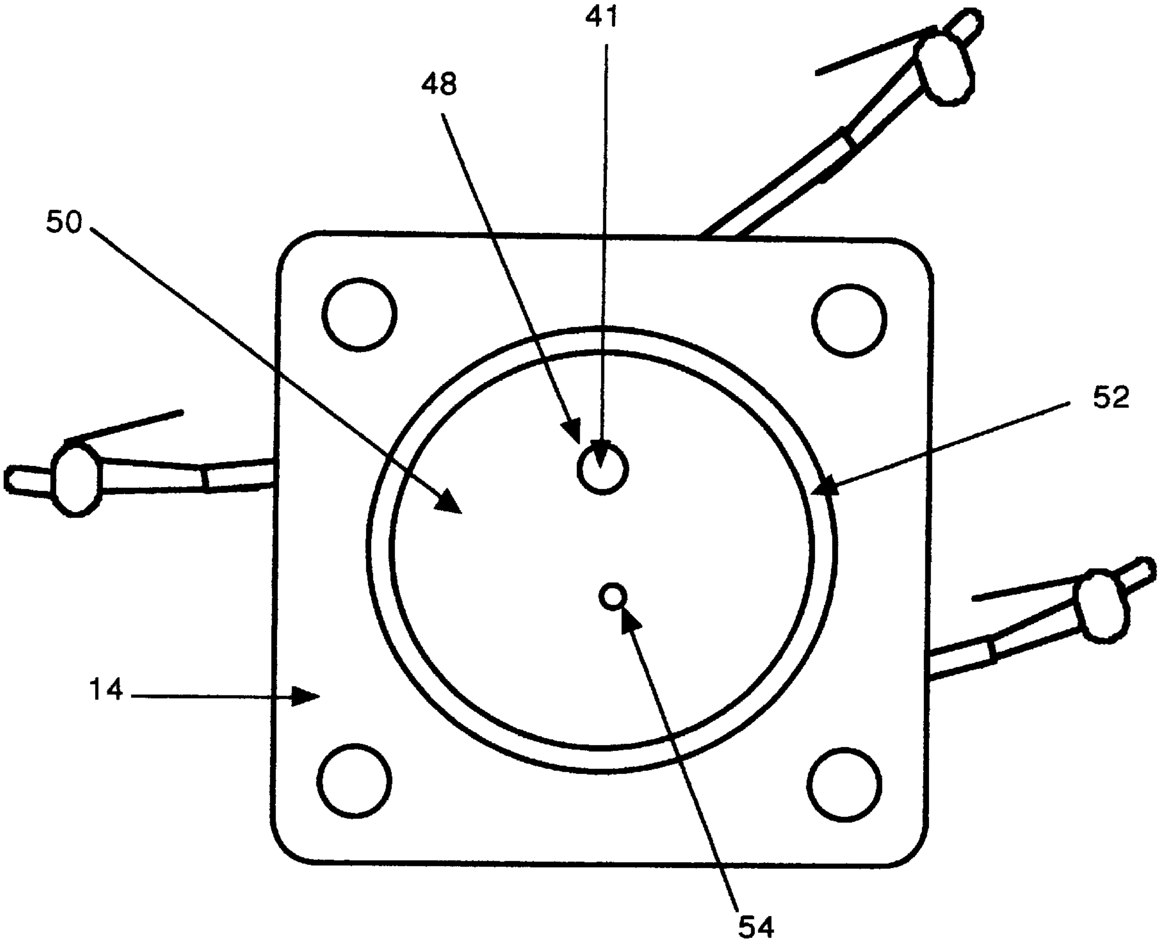
FIG. 4 is a view of the bottom face of a lid for the liquid dispenser shown in FIG. 1, and also shows the bottom face of the secondary container which extends through the dispenser lid.
Figure 4A:
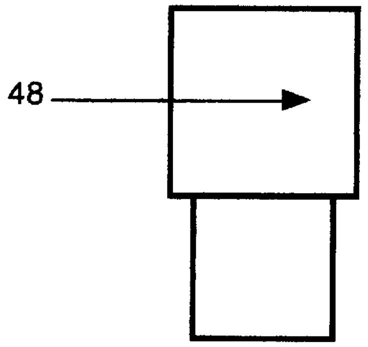
FIG. 4A is a detailed elevational view of a conduit fitting used with a discharge conduit of a submersible pump within the liquid dispenser.

As seen in FIG. 3A, manifold 43 is composed of a ¾" PVC "T" connection having plugs 58 at two opposing ends thereof and a female threaded opening 42 for engagement with the male thread fitting of connector 48. Manifold 43 further includes three ¼"×⅛" male thread-hose barb brass fittings for respective connection to three liquid dispensing conduits, such as ¼" braided PVC hoses 28. The manifold thereby permits the liquid dispensing conduits to communicate with the discharge conduit of pump 34. Each of the liquid dispensing conduits extend from manifold 43 through a respective ½" dispenser opening 26 in secondary container 21.

Figure 1A:
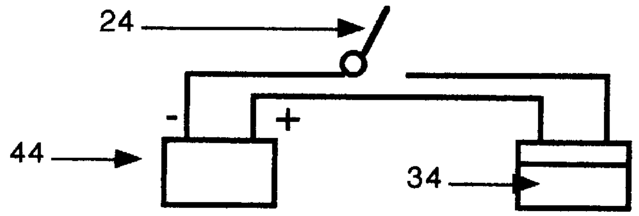
FIG. 1A is a schematic representation of an electrical circuit for operating the liquid dispenser.

Means, including 12v rechargeable battery 44 are included in dispenser 10 for activating the pump. Thus, as shown in FIG. 1A, battery 44 is electrically connected to pump 34 across switch 24. The electrical connections are made through electrical wires extending from pump 34 through opening 54 in cutout 50, via circular opening 19 in lid 14, to battery 44 and switch 24 within secondary container 21. Switch 24 extends through an opening in secondary container 21 for toggling between ON and OFF positions. The ON position closes the pump activation circuit, whereby the liquid stored in insulated container 12 is delivered to dispensing conduits 28 via discharge conduit 40 and manifold 43 for consumption by a plurality of users.

Dispensing conduits 28 each terminate in dispensing valve/lever assemblies 30, such as Chapin brand guns #6-4626 that control the flow of liquid to nozzles 32, such as Chapin brand adjustable spray nozzles #6-6003. In this manner, a plurality of users can each independently regulate the flow of liquid as desired.

Figure 5:
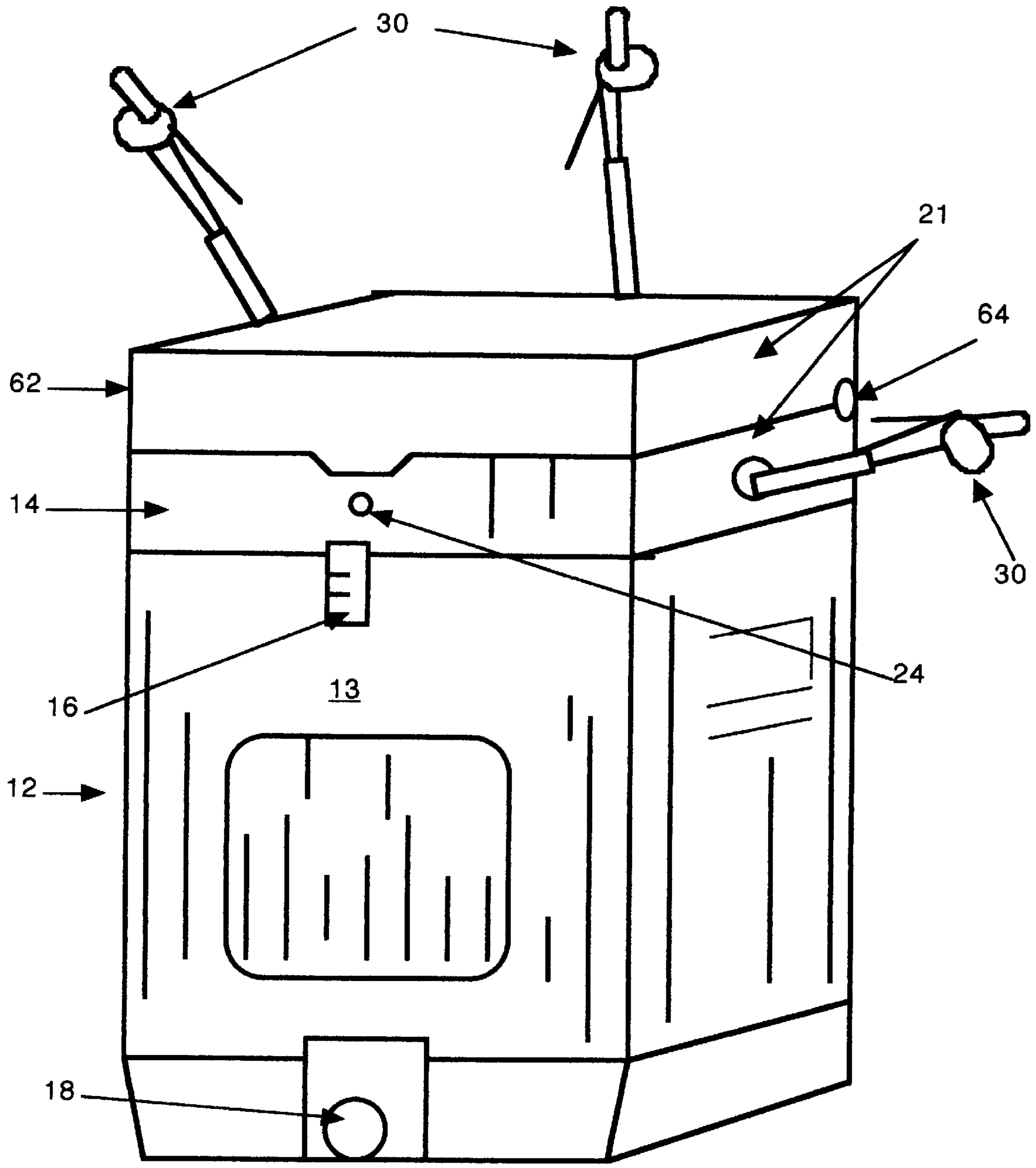
FIG. 5 is a perspective view of a second embodiment of a liquid dispenser in accordance with the present invention.
Figure 6:
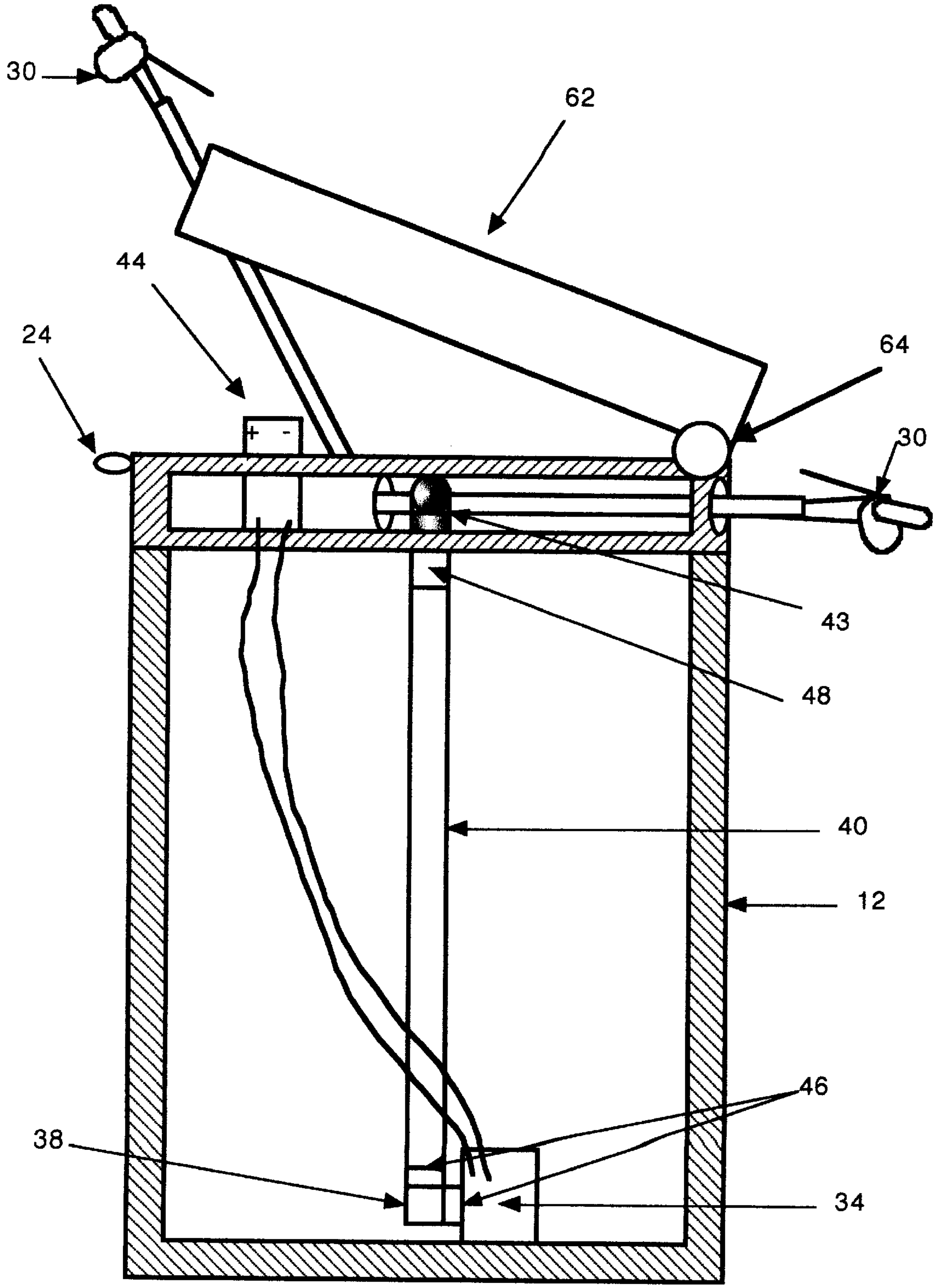
FIG. 6 is a sectional, elevational view of the liquid dispenser shown in FIG. 5.

FIGS. 5 and 6 illustrate a second embodiment of the liquid dispenser, referenced as 10'. For convenience, all components that differ in these figures from FIGS. 1–4 are numbered with the "prime" designations to distinguish the second embodiment from the first embodiment. Dispenser 10' includes typical insulated body 13 having an upper opening therein, but secondary container 21' serves as a lid that closes the upper opening of the insulated body. Thus, container 21' includes lower portion 14' that seats the upper opening of insulated container body 13, and upper portion 62' that forms a lid for container 21'. Upper portion 62' is pivotably connected at hinge 64' to lower portion 14'. Thus, upper portion 62' is moveable between open and closed positions permitting access to battery 44, manifold 43, and switch 24. Secondary container 21' therefore provides the same function as secondary container 21, but exhibits the same cross-sectional area as container body 13. This provides a greater surface area atop container 21', and permits liquid dispensers 10' to be stacked one atop another.

Figure 7:
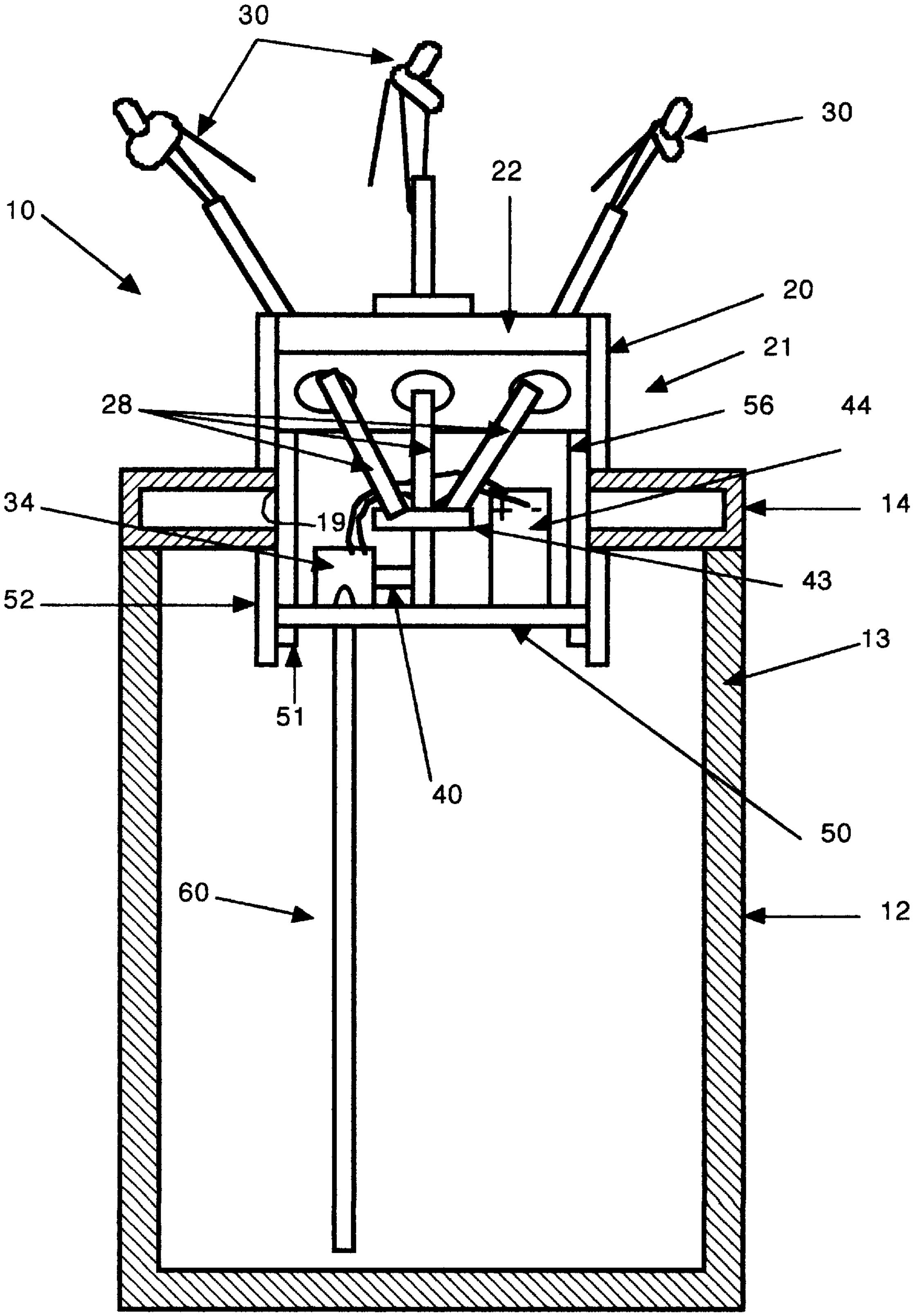
FIG. 7 is a sectional elevational view of the liquid dispenser similar to FIG. 2, but showing the pump positioned in the upper secondary container with the battery and manifold.

FIG. 7 illustrates a further embodiment of liquid dispenser 10, wherein pump 34 is positioned in secondary container 21 rather than insulated container 12. Thus, suction conduit 60 extends from the pump's suction nozzle to filter 47 positioned adjacent the bottom of the insulated container through an opening in the secondary container via opening 19 in the insulated container. The pump's discharge conduit 40 is therefor much shorter than in other embodiments, and extends to manifold 43 within the secondary container.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A portable dispenser of potable liquid, comprising:

an insulated container for storing the liquid;

a secondary container connected to said insulated container;

a pump positioned in said secondary container, said pump having a suction conduit connected thereto that communicates with said insulated container via openings in said secondary container and said insulated container and further having a discharge conduit connected thereto;

a manifold positioned in said secondary container and connected to the discharge conduit of said pump;

a plurality of liquid dispensing conduits connected to said manifold for communication with the discharge conduit, said liquid dispensing conduits each extending from said manifold through a dispenser opening in said secondary container and each terminating in a dispenser nozzle assembly for controlling the flow of liquid delivered through said liquid dispensing conduits, and means for activating said pump whereby the liquid stored in said insulated container is delivered to the dispensing conduits via the discharge conduit and said manifold for consumption by a plurality of users.

2. The liquid dispenser of claim 1, wherein said pump activating means comprises:

a electrical power supply positioned in said secondary container and electrically connected to said pump to form an electrical circuit; and switch means electrically connected between said pump and said power supply to open and close the circuit.

3. The liquid dispenser of claim 1, wherein:

said insulated container includes an insulated body and an insulated lid, the lid having a circular opening therethrough; and said secondary container is substantially cylindrical and has an outer diameter that approximates the circular opening permitting said secondary container to extend through the circular opening.

4. The liquid dispenser of claim 3, wherein said secondary container has a removable lid and a substantially cylindrical wall, the cylindrical wall including:

a central conduit section whose outer diameter approximates the circular opening in the lid, the central conduit section being positioned in the circular opening and connected to the lid such that an upper portion of the central conduit section extends above the lid and a lower portion extends below the lid;

an upper conduit section whose inner diameter approximates the outer diameter of the central conduit section, the upper conduit section fitting about and being connected to the upper portion of the central conduit section; and a lower conduit section whose inner diameter approximates the outer diameter of the central conduit section, the lower conduit section fitting about and being connected to the lower portion of the central conduit section.

5. The liquid dispenser of claim 1, wherein said insulated container includes an insulated body having an upper opening therein, and said secondary container serves as a lid that closes the upper opening of the insulated body.

6. The liquid dispenser of claim 5, wherein said pump activating means includes a battery positioned in said secondary container, and said secondary container has its own lid which is moveable between open and closed positions for permitting access to the battery.

7. The liquid dispenser of claim 1, wherein the suction conduit of said pump extends to the bottom of said insulated container via the openings in said secondary container and said insulated container.

* * * * *